United States Patent
Abraham et al.

(10) Patent No.: US 9,301,276 B2
(45) Date of Patent: *Mar. 29, 2016

(54) SYSTEMS, APPARATUS, AND METHODS FOR ASSOCIATION IN MULTI-HOP NETWORKS

(71) Applicant: Qualcomm Incorporated, San Diego, CA (US)

(72) Inventors: Santosh Paul Abraham, San Diego, CA (US); George Cherian, San Diego, CA (US); Amin Jafarian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/747,886

(22) Filed: Jan. 23, 2013

(65) Prior Publication Data

US 2014/0071882 A1  Mar. 13, 2014

Related U.S. Application Data

(60) Provisional application No. 61/698,430, filed on Sep. 7, 2012.

(51) Int. Cl.
*H04W 60/00* (2009.01)
*H04W 88/08* (2009.01)
(Continued)

(52) U.S. Cl.
CPC .............. *H04W 60/00* (2013.01); *H04W 12/02* (2013.01); *H04W 48/20* (2013.01); *H04W 76/04* (2013.01); *H04W 88/08* (2013.01); *H04W 12/06* (2013.01); *H04W 84/18* (2013.01); *H04W 88/04* (2013.01)

(58) Field of Classification Search
CPC ...... H04W 60/00; H04W 84/18; H04W 88/04
USPC ....................................... 370/315
See application file for complete search history.

(56) References Cited

U.S. PATENT DOCUMENTS 7,082,130 B2   7/2006  Borella et al.
7,633,944 B1 * 12/2009  Chang et al. ............ 370/392
(Continued)

FOREIGN PATENT DOCUMENTS

EP          2144463 A1    1/2010
WO    WO-2008004066 A2   1/2008
(Continued)

OTHER PUBLICATIONS

International Search Report and Written Opinion—PCT/US2013/056137—ISA/EPO—Dec. 6, 2013.
(Continued)

*Primary Examiner* — Min Jung
(74) *Attorney, Agent, or Firm* — S. Hossain Beladi

(57) ABSTRACT

Systems, methods, and devices for communicating data in a wireless communications network are described herein. One innovative aspect of the present disclosure includes a method of communicating in a wireless network. The wireless network includes an access point and a relay. The method includes indicating to a client, at the relay, a network address of the access point. The method further includes receiving an association request, from the client, addressed to the access point. The method further includes forwarding the association request to the access point.

34 Claims, 11 Drawing Sheets

(51) Int. Cl.
   *H04W 76/04* (2009.01)
   *H04W 12/02* (2009.01)
   *H04W 48/20* (2009.01)
   *H04W 12/06* (2009.01)
   *H04W 84/18* (2009.01)
   *H04W 88/04* (2009.01)

(56) References Cited

U.S. PATENT DOCUMENTS

| | | |
|---|---|---|
| 7,787,600 B1 | 8/2010 | Bari |
| 7,889,713 B2 | 2/2011 | Zheng et al. |
| 8,104,091 B2 | 1/2012 | Qin et al. |
| 8,270,947 B2 * | 9/2012 | Metke et al. ............... 455/411 |
| 8,402,513 B2 * | 3/2013 | Yoon et al. ................... 726/4 |
| 2004/0208151 A1 | 10/2004 | Haverinen et al. |
| 2005/0107102 A1 * | 5/2005 | Yoon et al. .................. 455/466 |
| 2005/0135422 A1 | 6/2005 | Yeh |
| 2005/0235048 A1 | 10/2005 | Costa-Requena et al. |
| 2006/0165103 A1 | 7/2006 | Trudeau et al. |
| 2007/0049252 A1 | 3/2007 | Smith et al. |
| 2007/0165592 A1 | 7/2007 | Gossain et al. |
| 2008/0165735 A1 | 7/2008 | Chen et al. |
| 2008/0273700 A1 | 11/2008 | Wentink |
| 2008/0285520 A1 * | 11/2008 | Forte et al. .................. 370/331 |
| 2009/0147699 A1 | 6/2009 | Ruy et al. |
| 2009/0245163 A1 | 10/2009 | Inoue |
| 2010/0115272 A1 * | 5/2010 | Batta ........................... 713/162 |
| 2011/0038480 A1 | 2/2011 | Lin |
| 2011/0078311 A1 | 3/2011 | Nakashima |
| 2011/0110521 A1 | 5/2011 | Yang et al. |
| 2011/0242970 A1 | 10/2011 | Prakash et al. |
| 2011/0243061 A1 | 10/2011 | Wang et al. |
| 2011/0276665 A1 | 11/2011 | Kim et al. |
| 2012/0087344 A1 | 4/2012 | Sood |
| 2012/0275383 A1 | 11/2012 | Matsukawa |
| 2012/0307685 A1 * | 12/2012 | Kim et al. ..................... 370/255 |
| 2013/0003689 A1 | 1/2013 | Kwon et al. |
| 2013/0016625 A1 * | 1/2013 | Murias et al. ............... 370/254 |
| 2013/0083773 A1 | 4/2013 | Watfa et al. |
| 2013/0173924 A1 | 7/2013 | Kim et al. |
| 2013/0198512 A1 | 8/2013 | Rubin et al. |
| 2013/0294331 A1 * | 11/2013 | Wang ..................... H04B 7/155 370/315 |
| 2013/0329627 A1 | 12/2013 | Liu |
| 2014/0056209 A1 | 2/2014 | Park et al. |
| 2014/0071850 A1 | 3/2014 | Abraham et al. |
| 2014/0071881 A1 | 3/2014 | Abraham et al. |
| 2014/0071883 A1 | 3/2014 | Abraham et al. |
| 2014/0075189 A1 * | 3/2014 | Abraham .............. H04W 76/04 713/168 |

FOREIGN PATENT DOCUMENTS

| | | |
|---|---|---|
| WO | 2011083570 A1 | 7/2011 |
| WO | 2011090257 A1 | 7/2011 |
| WO | 2012033379 A2 | 3/2012 |
| WO | 2012096611 A2 | 7/2012 |

OTHER PUBLICATIONS

Marc Holness et al: "Four address support by RPR MAC service primitives; mh_4address 01," IEEE Draft; MH_4ADDRESS_01, IEEESA, Piscataway, NJ USA, vol. 802.17, Mar. 17, 2005, pp. 1-12, XPCT17735537.

Wei H-Y et al., "Two-Hop-Relay Architecture for Nextgeneration WWAN/WLAN Integration", IEEE Wireless Communications, IEEE Service Center, Piscataway, NJ, US, vol. 11, No. 2, Apr. 1, 2004, pp. 24-30, XP001196396, ISSN: 1536-1284, DOI: 10.1109/MWC.2004.1295734.

Ezlan.Net "Wireless Network—Hardware Configuration Modes", 1st Published, Dec. 2004, Ezlan.Net, http://www.ezlan.net/Wireless_Modes.html.

Mathews., et al., "Evolution of the Wireless LAN Security Architecture to IEEE 802.11 i (PA2)", Proceedings of the Fourth IASTED Asian Conference on Communication Systems and Networks, pp. 292-297, ACTA Press Anaheim, CA, USA, 2007.

Ogier R., et al., "Topology Dissemination Based on Reverse-Path Forwarding (TBRPF)," Feb. 2004, Request for Comment: 3684, 32 pages.

* cited by examiner

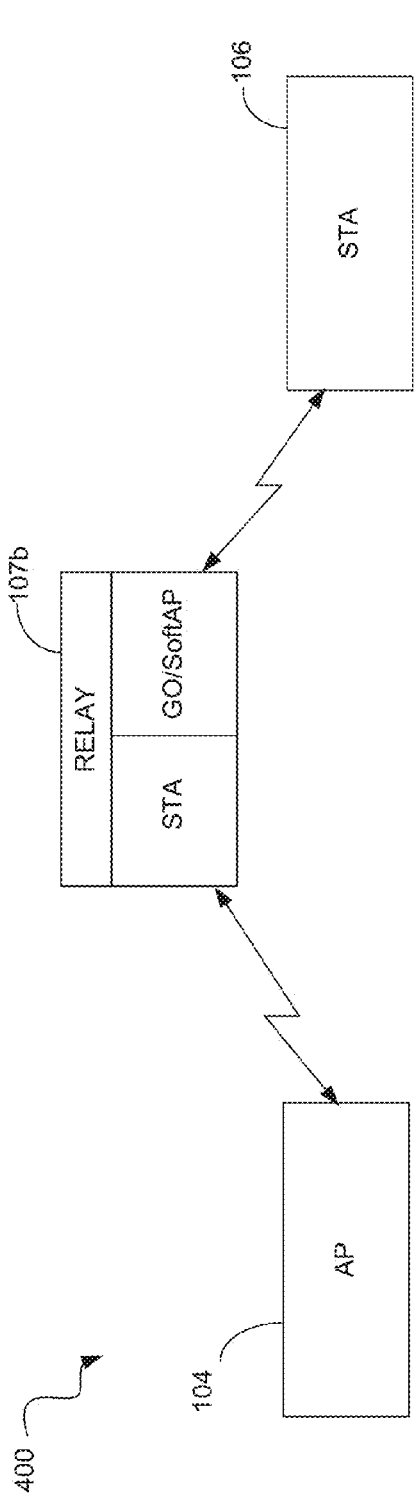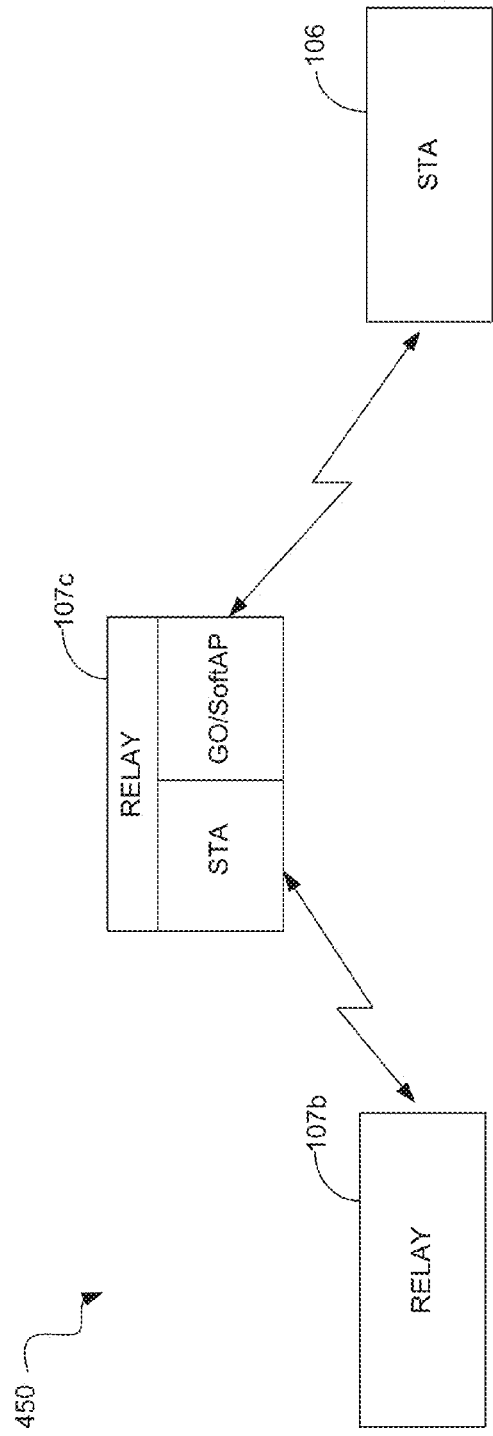
FIG. 4A
FIG. 4B

SYSTEMS, APPARATUS, AND METHODS FOR ASSOCIATION IN MULTI-HOP NETWORKS

CROSS-REFERENCE TO RELATED APPLICATIONS

The present application claims priority to U.S. Provisional Application No. 61/698,430, filed Sep. 7, 2012, which is hereby incorporated by reference herein.

BACKGROUND

1. Field

The present application relates generally to wireless communications, and more specifically to systems, methods, and devices for using a relay in a wireless communication network.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/bridging technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

The devices in a wireless network can transmit/receive information between each other. In some aspects, the devices on a wireless network can have a limited transmission range. Relay devices can extend the range of a wireless network, but can increase overhead such as, for example, association, encryption, and filtering overhead. Thus, improved systems, methods, and devices for associating, encrypting, and filtering are desired for wireless networks having at least one relay node.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One innovative aspect of the present disclosure includes a method of communicating in a wireless network. The wireless network includes an access point and a relay. The method includes indicating to a client, at the relay, a network address of the access point. The method further includes receiving an association request, from the client, addressed to the access point. The method further includes forwarding the association request to the access point.

Another innovative aspect of the present disclosure includes a method of communicating in a wireless network. The method includes encrypting a message based, at least in part, on an original source address, and a final destination address. The method further includes transmitting the encrypted message to a relay for delivery to the final destination address.

Another innovative aspect of the present disclosure includes a device configured to communicate in a wireless network. The wireless network includes an access point and a relay. The device includes a processor configured to indicate to a client, a network address of the access point. The device further includes a receiver configured to receive an association request, from the client, addressed to the access point. The device includes a transmitter configured to forward the association request to the access point.

Another innovative aspect of the present disclosure includes a device configured to communicate in a wireless network. The device includes a processor configured to encrypt a message based, at least in part, on an original source address, and a final destination address. The device further includes a transmitter configured to transmit the encrypted message to a relay for delivery to the final destination address.

Another innovative aspect of the present disclosure includes an apparatus for communicating in a wireless network. The wireless network includes an access point and a relay. The apparatus includes means for indicating to a client, a network address of the access point. The apparatus further includes means for receiving an association request, from the client, addressed to the access point. The apparatus further includes means for forwarding the association request to the access point.

Another innovative aspect of the present disclosure includes an apparatus for communicating in a wireless network. The apparatus includes means for encrypting a message based, at least in part, on an original source address, and a final destination address. The apparatus further includes means for transmitting the encrypted message to a relay for delivery to the final destination address.

Another innovative aspect of the present disclosure includes a non-transitory computer-readable medium including code that, when executed, causes an apparatus to indicate, to a client, a network address of the access point. The medium further includes code that, when executed, causes the apparatus to receive an association request, from the client, addressed to the access point. The medium further includes code that, when executed, causes the apparatus to forward the association request to the access point.

Another innovative aspect of the present disclosure includes a non-transitory computer-readable medium including code that, when executed, causes an apparatus to encrypt a message based, at least in part, on an original source address, and a final destination address. The medium further includes code that, when executed, causes the apparatus to transmit the encrypted message to a relay for delivery to the final destination address.

Another innovative aspect of the present disclosure includes a method of communicating in a wireless network. The wireless network includes an access point and a relay. The method includes receiving, at the access point, an association request from a client. The association request is forwarded by a relay. The method further includes determining a success or failure of association. The method further includes transmitting to the relay, when association fails, an indication that one or more subsequent messages from the client should be filtered.

Another innovative aspect of the present disclosure includes a device configured to communicate in a wireless network. The wireless network includes an access point and a relay. The device includes a receiver configured to receive an association request from a client, forwarded by the relay. The device further includes a processor configured to determine a success or failure of association. The device further includes a transmitter configured to transmit to the relay, when association fails, an indication that one or more subsequent messages from the client should be filtered.

Another innovative aspect of the present disclosure includes an apparatus for communicating in a wireless network. The wireless network includes an access point and a relay. The apparatus includes means for receiving, at the access point, an association request from a client, forwarded by the relay. The apparatus further includes means for determining a success or failure of association. The apparatus further includes means for transmitting to the relay, when association fails, an indication that one or more subsequent messages from the client should be filtered.

Another innovative aspect of the present disclosure includes a non-transitory computer-readable medium including code that, when executed, causes an apparatus to receive an association request from a client, forwarded by the relay. The medium further includes code that, when executed, causes the apparatus to determine a success or failure of association. The medium further includes code that, when executed, causes the apparatus to transmit to the relay, when association fails, an indication that one or more subsequent messages from the client should be filtered.

BRIEF DESCRIPTION OF THE DRAWINGS

FIG. 4A illustrates a wireless communications system, according to an embodiment.

FIG. 4B illustrates a wireless communications system, according to another embodiment.

DETAILED DESCRIPTION

Figure 1:
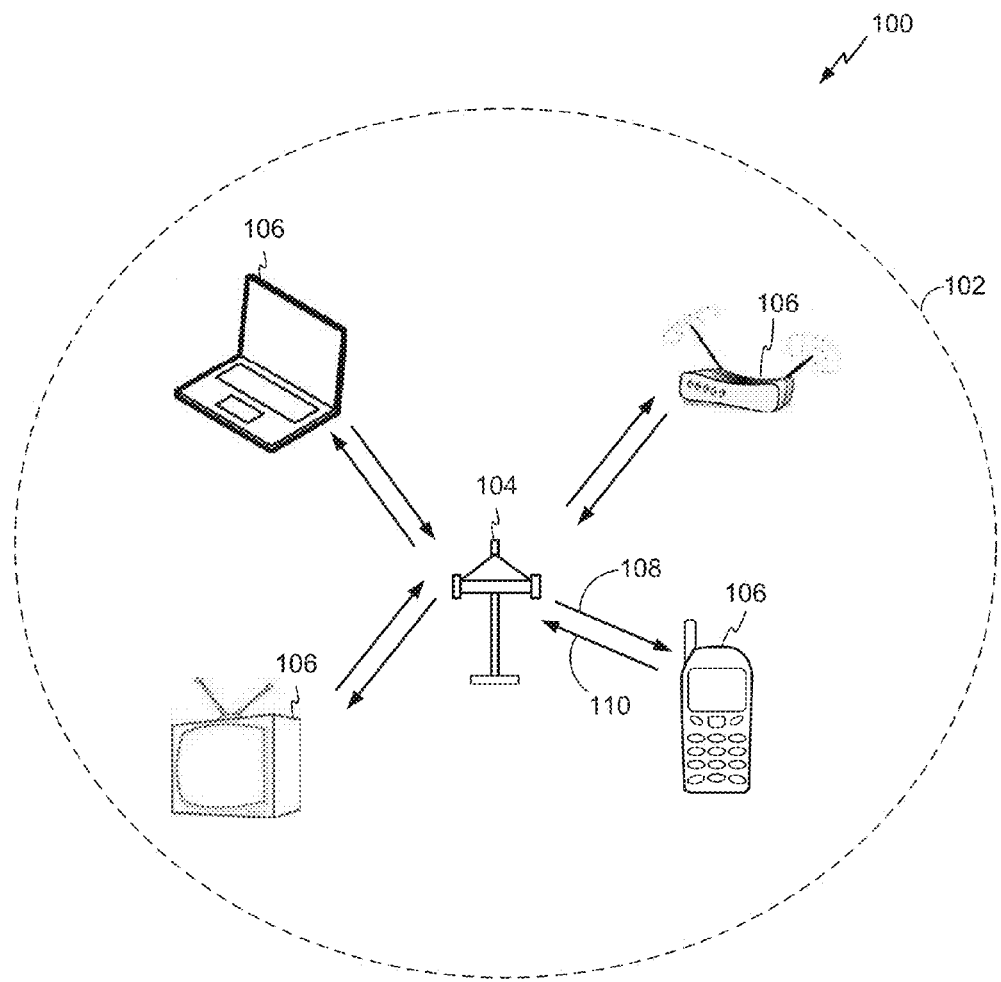
FIG. 1 shows an exemplary wireless communication system.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals in a sub-gigahertz band can be transmitted according to the IEEE 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol can be used for sensors, metering, and smart grid networks. Advantageously, aspects of certain devices implementing the IEEE 802.11 protocol can consume less power than devices implementing other wireless protocols, and/or can be used to transmit wireless signals across a relatively long range, for example about one kilometer or longer.

In some implementations, a WLAN includes various interconnected devices, referred to as "nodes." For example, the WLAN can include access points ("APs") and stations ("STAs" or "clients"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WI-FI™ compliant wireless link (e.g., an IEEE 802.11 protocol such as 802.11s, 802.11h, 802.11a, 802.11b, 802.11g, and/or 802.11n, etc.) to obtain general connectivity to the Internet or to other wide area networks. In some implementations a STA can also be used as an AP.

An access point ("AP") can also include, be implemented as, or known as a gateway, a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement one or more of the IEEE 802.11 standards, for example. Such devices, whether used as a STA or AP or other device, can be used for smart metering or in a smart grid network. Such devices can provide sensor applications or be used in home automation. The devices can be used in a healthcare context, for example for personal healthcare. They can also be used for surveillance, to enable extended-range Internet connectivity (e.g., for use with hotspots), or to implement machine-to-machine communications.

The transmission range of wireless devices on a wireless network is of a limited distance. To accommodate the limited transmission range of devices communicating on a wireless network, access points can be positioned such that an access point is within the transmission range of the devices. In wireless networks that include devices separated by substantial geographic distance, multiple access points can be necessary to ensure all devices can communicate on the network. Including these multiple access points can add cost to the implementation of the wireless networks. Thus, a wireless network design that reduces the need for additional access points when the wireless network spans a distance that can exceed the transmission range of devices on the network can be desired.

A relay can be less expense than an access point. For example, some access point designs can include both wireless networking hardware and hardware sufficient to interface with traditional wired LAN based technologies such as Ethernet. This additional complexity can cause access points to be more expensive than relays. Additionally, because the access points can interface with a wired LAN, the cost of installing multiple access points can extend beyond the cost of the access point itself, and can include wiring costs associated with the wired LAN, and the labor and other installation costs associated with installing and configuring a wired LAN. Use of a relay instead of an access point can reduce some of the costs associated with an access point. For example, because a relay can use only wireless networking technologies, the design of the relay can provide for reduced cost when compared to access point designs. Additionally, the ability to relay wireless traffic can reduce the need for wired LAN cabling and installation expenses associated with access points.

FIG. 1 shows an exemplary wireless communication system 100. The wireless communication system 100 can operate pursuant to a wireless standard, for example an 802.11 standard. The wireless communication system 100 can include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with orthogonal frequency-division multiplexing ("OFDM/OFDMA") techniques. In embodiments employing OFDM/OFDMA techniques, the wireless communication system 100 can be referred to as an OFDM/OFDMA system. Alternatively, signals can be sent and received between the AP 104 and the STAs 106 in accordance with code division multiple access ("CDMA") techniques. In embodiments employing CDMA techniques, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104, along with the STAs 106 associated with the AP 104, and that use the AP 104 for communication, can be referred to as a basic service set (BSS). It should be noted that the wireless communication system 100 can be configured as a peer-to-peer network between the STAs 106, without a central AP 104. Accordingly, the functions of the AP 104 described herein can alternatively be performed by one or more of the STAs 106.

The AP 104 can transmit a beacon signal (or simply a "beacon"), via a communication link such as the downlink 108, to other nodes STAs 106 of the system 100, which can help the other nodes STAs 106 to synchronize their timing with the AP 104, or which can provide other information or functionality. Such beacons can be transmitted periodically. In one aspect, the period between successive transmissions can be referred to as a superframe. Transmission of a beacon can be divided into a number of groups or intervals. In one aspect, the beacon can include, but is not limited to, information such as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon can include information both common (e.g., shared) amongst several devices, and information specific to a given device.

In some aspects, a STA 106 can be required to associate with the AP 104 and send communications to and/or receive communications from the AP 104. In one aspect, information for associating is included in a beacon broadcast by the AP 104. To receive the beacon, the STA 106 can, for example, perform a broad coverage search over a coverage region. The STA 106 can also perform a search by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

Figure 2A:
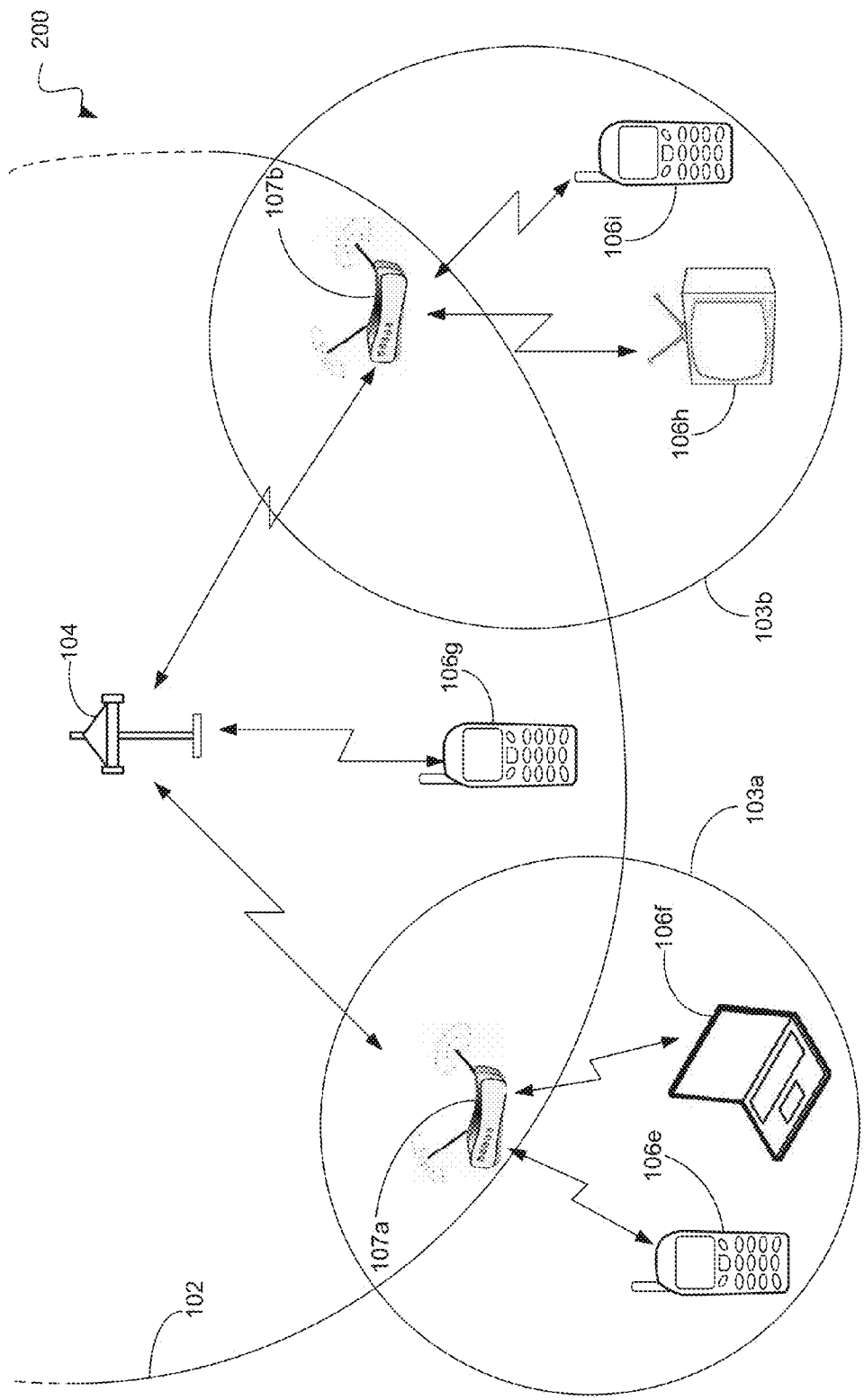
FIG. 2A shows another exemplary wireless communication system in which aspects of the present disclosure can be employed.

FIG. 2A shows another exemplary wireless communication system 200 in which aspects of the present disclosure can be employed. The wireless communication system 200 can also operate pursuant to a wireless standard, for example any one of the 802.11 standards. The wireless communication system 200 includes an AP 104, which communicates with relays 107a-107b and one or more STAs 106. The relays 107a-107b can also communicate with one or more STAs 106. The wireless communication system 200 can function in accordance with OFDM/OFDMA techniques and/or CDMA techniques.

The AP 104 can act as a base station and provide wireless communication coverage in the basic service area (BSA) 102. In an embodiment, one or more STAs 106 can be located within the AP's BSA 102 while other STAs can be located outside the AP's BSA 102. For example, as illustrated in FIG. 2A, STA 106g can be located within the AP 104's BSA 102. As such, STA 106g can associate with the AP 104 and perform wireless communications directly with the AP 104. Other STAs such as, for example, the STAs 106e-106f and 106h-106i can be outside the BSA 102 of the AP 104. The relays 107a-107b can be inside the BSA 102 of the AP 104. As such, the relays 107a-107b can be able to associate with the AP 104 and perform wireless communications directly with the AP 104.

The AP 104 can transmit a beacon signal (or simply a "beacon"), via a communication link such as the downlink 108, to other nodes STAs 106 of the system 200, which can help the STA 106g or the relays 107a-107b to synchronize their timing with the AP 104, or which can provide other information or functionality. Such beacons can be transmitted periodically. In one aspect, the period between successive transmissions can be referred to as a superframe. Transmission of a beacon can be divided into a number of groups or intervals. In one aspect, the beacon can include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon can include information both common (e.g., shared) amongst several devices, and information specific to a given device.

In some aspects, the STA 106g and/or the relays 107a-107b can be required to associate with the AP 104 and send communications to and/or receive communications from the AP 104. In one aspect, information for associating is included in a beacon broadcast by the AP 104. To receive such a beacon, the STA 106g and/or the relays 107a-107b can, for example, perform a broad coverage search over a coverage region. The STAs 106 and/or the relays 107a-107b can also perform a search by sweeping a coverage region in a lighthouse fashion, for example. After receiving the information for associating, the STA 106g and/or the relays 107a-107b can transmit a reference signal, such as an association probe or request, to the AP 104. In some aspects, the AP 104 can use backhaul services, for example, to communicate with a larger network, such as the Internet or a public switched telephone network (PSTN).

The AP 104, along with the STAs 106 and/or the relays 107a-107b associated with the AP 104, and that use the AP 104 for communication, can be referred to as a basic service set (BSS). It should be noted that the wireless communication system 200 can function as a peer-to-peer network between the STAs 106 and/or the relays 107a-107b, without the central AP 104. Accordingly, the functions of the AP 104 described herein can alternatively be performed by one or more of the STAs 106 and the relays 107a-107b.

The relays 107a and 107b can also act as a base station and provide wireless communication coverage in a basic service area 103a and 103b, respectively. In an embodiment, some STAs 106 can be located within the BSA of a relay 107a or 107b. For example, the STA 106e and the STA 106f are illustrated within the BSA 103a of the relay 107a. The STA 106h and the STA 106i are illustrated within the BSA 103b of the relay 107b. As such, STAs 106e-106f can associate with the relay 107a and perform wireless communications directly with the relay 107a. The relay 107a can form an association with the AP 104 and perform wireless communications with the AP 104 on behalf of the STA 106e-106f. Similarly, the STAs 106h-106i can associate with the relay 107b and perform wireless communications directly with the relay 107b. The relay 107b can form an association with the AP 104 and perform wireless communications with the AP 104 on behalf of the STA 106h-106i.

In some aspects, the STAs 106e-106f and the STAs 106h-106i can be required to associate with the relays 107a-107b and send communications to and/or receive communications from the relays 107a-107b. In one aspect, information for associating is included in a beacon broadcast by the relays 107a-107b. The beacon signal can include the same service set identifier (SSID) as that used by an access point, such as the AP 104, with which the relay has formed an association. To receive the beacon, the STAs 106e-106f and 106h-106i can, for example, perform a broad coverage search over a coverage region. The STAs 106e-106f and 106h-106i can also perform a search by sweeping a coverage region in a lighthouse fashion, for example.

In an embodiment, after the relay 107a and/or 107b has formed an association with the AP 104 and provided a beacon signal, one or more of the STAs 106e-106i can form an association with the relay 107a and/or 107b. In an embodiment, one or more of the STAs 106e-106i can form an association with the relay 107a and/or 107b before the relay 107a and/or 107b has formed an association with the AP 104. After receiving the information for associating, the STAs 106e-106f and 106h-106i can transmit a reference signal, such as an association probe or request, to the relays 107a-107b. The relays 107a-107b can accept the association request and send an association reply to the STAs 106e-106f and 106h-106i. The STAs 106e-106f and 106h-106i can send and receive data with the relays 107a-107b. The relays 107a-107b can forward data received from the one or more STAs 106e-106f and 106h-106i to the AP 104 with which it has also formed an association. Similarly, when the relays 107a-107b receives data from the AP 104, the relays 107a-107b can forward the data received from the AP 104 to an appropriate STA 106e-106f or 106h-106i. By using the relay services of the relays 107a-107b, the STAs 106e-106f and 106h-106i can effectively communicate with the AP 104, despite being unable to directly communicate with the AP 104.

Figure 2B:
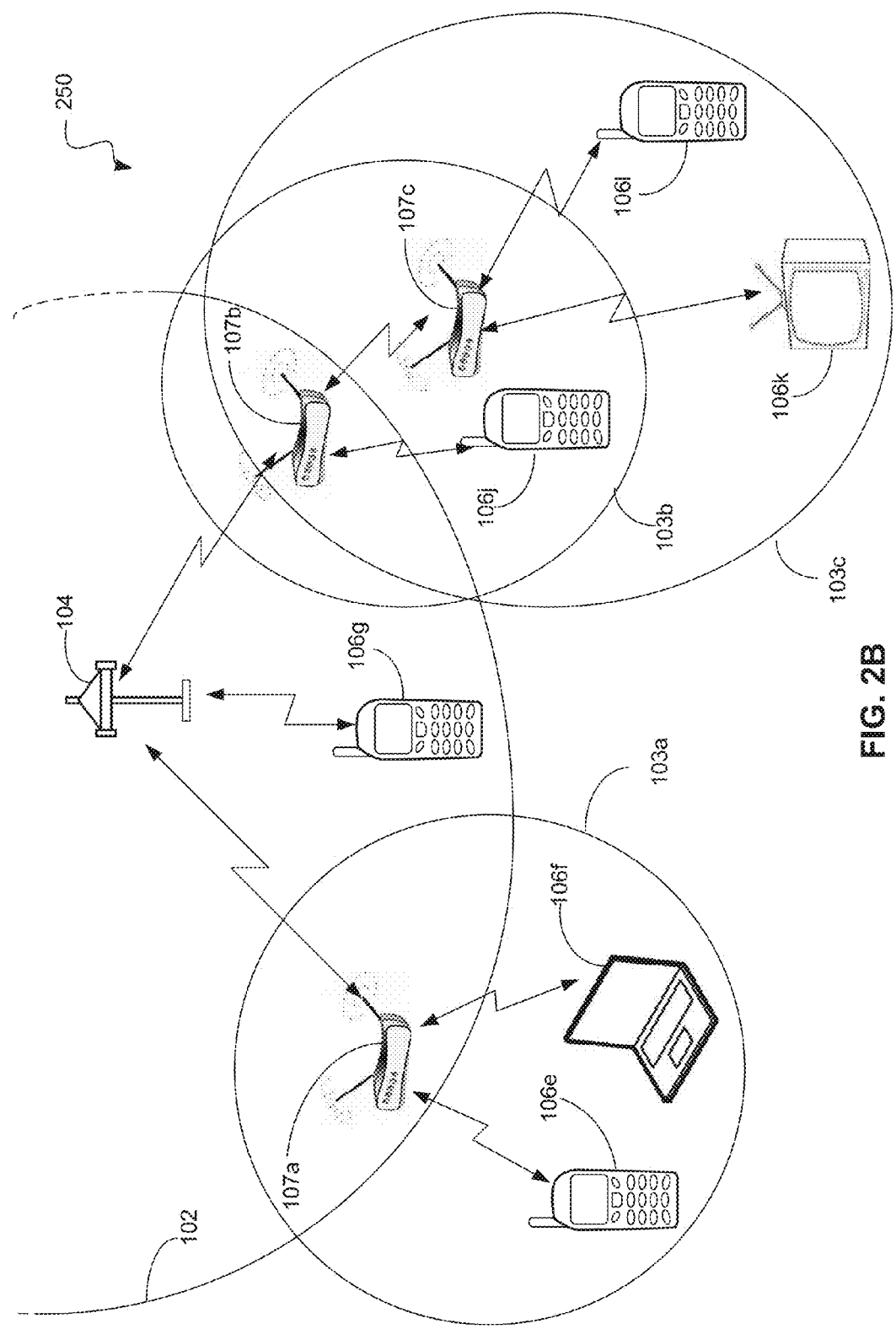
FIG. 2B shows another exemplary wireless communication system in which aspects of the present disclosure can be employed.

FIG. 2B shows another exemplary wireless communication system 250 in which aspects of the present disclosure can be employed. The wireless communication system 250 can also operate pursuant to a wireless standard, for example any one of the 802.11 standards. Similar to FIG. 2A, the wireless communication system 250 can include an AP 104, which communicates with wireless nodes including the relays 107a-107b and one or more STAs 106e-106g and 106j-106l. The relays 107a-107b can also communicate with wireless nodes such as some STAs 106. The wireless communication system 250 of FIG. 2B differs from the wireless communication system 200 of FIG. 2A in that the relays 107a-107b can also communicate with wireless nodes that are other relays, such as the relay 107c. As shown, the relay 107b is in communication with the relay 107c. The relay 107c can also communicate with the STAs 106k and 106l. The wireless communication system 250 can function in accordance with OFDM/OFDMA techniques or CDMA techniques.

As described above with respect to FIG. 2A, the AP 104 and relays 107a-107b can act as a base station and provide wireless communication coverage in a basic service area (BSA). As shown in FIG. 2B, the relay 107c can also act as a base station and provide wireless communication in a BSA. In the illustrated embodiment, each of the AP 104 and the relays 107a-107c cover a basic service area 102 and 103a-103c, respectively. In an embodiment, some STAs 106e-106g and 106j-106l can be located within the AP's BSA 102 while other STAs can be located outside the AP's BSA 102. For example, the STA 106g can be located within the AP 104's BSA 102. As such, the STA 106g can associate with the AP 104 and perform wireless communications directly with the AP 104. Other STAs such as, for example, the STAs 106e-106f and the STAs 106j-l can be outside the BSA 102 of the AP 104. The relays 107a-107b can be inside the BSA 102 of the AP 104. As such, the relays 107a-107b can associate with the AP 104 and perform wireless communications directly with the AP 104.

The relay 107c can be outside the BSA 102 of the AP 104. The relay 107c can be within the BSA 103b of the relay 107b. Therefore, the relay 107c can associate with the relay 107b and perform wireless communications with the relay 107b. The relay 107b can perform wireless communications with the AP 104 on behalf of the relay 107c. The STAs 106k-106l can associate with the relay 107c. The STAs 106k-106l can perform wireless communications via indirect communication with the AP 104 and the relay 107b via communication with the relay 107c.

To communicate with the relay 107c, the STAs 106k-106l can associate with the relay 107c in a similar manner as the STAs 106e-f associate with the relay 107a, as described above. Similarly, the relay 107c can associate with the relay 107b in a similar manner as the relay 107b associates with the AP 104. Therefore, the wireless communication system 250 provides a multi-tiered topology of relays extending out from the AP 104 to provide wireless communications services beyond the BSA 102 of the AP 104. The STAs 106e-106g and 106j-106l can communicate within the wireless communication system 250 at any level of the multi-tiered topology. For example, as shown, STAs can communicate directly with the AP 104, as shown by the STA 106g. STAs can also communicate at a "first tier" of relays, for example, as shown by the STAs 106e-f and 106j which communicate with relays 107a-107b respectively. STAs can also communicate at a second tier of relays, as shown by the STAs 106k-106l, which communicate with the relay 107c.

Figure 3:
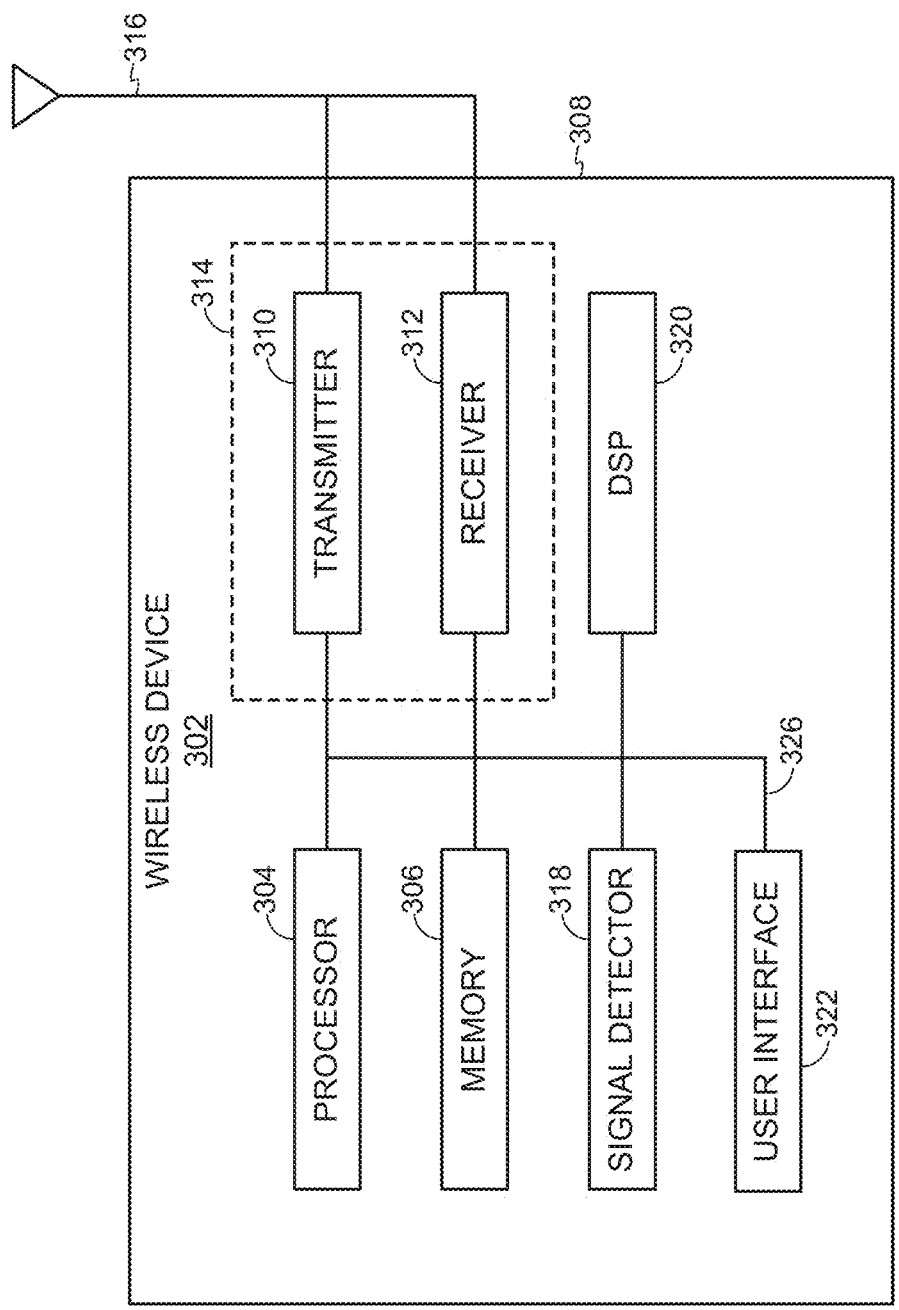
FIG. 3 shows an exemplary functional block diagram of a wireless device that can be employed within the wireless communication systems of FIGS. 1, 2A, and/or 2B.

FIG. 3 shows an exemplary functional block diagram of a wireless device 302 that can be employed within the wireless communication systems 100, 200, and/or 250 of FIGS. 1, 2A, and/or 2B. The wireless device 302 is an example of a device that can be configured to implement the various methods described herein. For example, the wireless device 302 can include the AP 104, one of the STAs 106e-106l, and/or one of the relays 107a-107c.

The wireless device 302 can include a processor 304 configured to control operation of the wireless device 302. The processor 304 can also be referred to as a central processing unit (CPU). A memory 306, which can include both read-only memory (ROM) and/or random access memory (RAM), can provide instructions and data to the processor 304. A portion of the memory 306 can also include non-volatile random access memory (NVRAM). The processor 304 can perform logical and arithmetic operations based on program instructions stored within the memory 306. The instructions in the memory 306 can be executable to implement the methods described herein.

The processor 304 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 302 can also include a housing 308 that can include a transmitter 310 and/or a receiver 312 to allow transmission and reception of data between the wireless device 302 and a remote location. The transmitter 310 and receiver 312 can be combined into a transceiver 314. An antenna 316 can be attached to the housing 308 and electrically coupled to the transceiver 314. In an embodiment, the antenna 316 can be within the housing 308. In various embodiments, the wireless device 302 can also include multiple transmitters, multiple receivers, multiple transceivers, and/or multiple antennas.

The wireless device 302 can also include a signal detector 318 that can detect and quantify the level of signals received by the transceiver 314. The signal detector 318 can detect such signals as total energy, energy per subcarrier per symbol, power spectral density, and other signals. The wireless device 302 can also include a digital signal processor (DSP) 320 for use in processing signals. The DSP 320 can be configured to process packets for transmission and/or upon receipt. In some aspects, the packets can include a physical layer data unit (PPDU).

The wireless device 302 can further include a user interface 322, in some aspects. The user interface 322 can include a keypad, a microphone, a speaker, and/or a display. The user interface 322 can include any element or component that conveys information to a user of the wireless device 302 and/or receives input from the user.

The various components of the wireless device 302 can be coupled together by a bus system 326. The bus system 326 can include a data bus, for example, as well as a power bus, a control signal bus, and a status signal bus in addition to the data bus. Those of skill in the art will appreciate the components of the wireless device 302 can be coupled together or accept or provide inputs to each other using some other mechanism.

Although a number of separate components are illustrated in FIG. 3, those of skill in the art will recognize that one or more of the components can be combined or commonly implemented. For example, the processor 304 can be used to implement not only the functionality described above with respect to the processor 304, but also to implement the functionality described above with respect to the signal detector 318 and/or the DSP 320. Further, each of the components illustrated in FIG. 3 can be implemented using a plurality of separate elements.

The wireless device 302 can include an AP 104, a STA 106e-106l, or a relay 107a-107c, and can be used to transmit and/or receive communications. That is, any of the AP 104, the STAs 106e-106l, or the relays 107a-107c, can serve as transmitter or receiver devices. Certain aspects contemplate the signal detector 318 being used by software running on memory 306 and processor 304 to detect the presence of a transmitter or receiver.

FIG. 4A illustrates a wireless communications system 400, according to an embodiment. The wireless communications system 400 includes an AP 104, a station (STA) 106, and a relay 107b. Note that while only one STA 106 and only one relay 107b are illustrated, the wireless communications system 400 can include any number of STAs and relays. In some embodiments, the AP 104 can be outside the transmission range of the STA 106. In some embodiments, the STA 106 can also be outside the transmission range of the AP 104. In these embodiments, the AP 104 and the STA 106 can communicate with the relay 107, which can be within the transmission range of both the AP 104 and STA 106. In some embodiments, both the AP 104 and STA 106 can be within the transmission range of the relay 107b.

In some implementations, the relay 107b can communicate with the AP 104 in the same manner as a STA would communicate with the AP. In some aspects, the relay 107b can implement a WI-FI DIRECT™ point-to-point group owner capability or a software-enabled access point ("SoftAP") capability. In some aspects, a relay 107b can associate with the AP 104 and send communications to and/or receive communications from the AP 104. In one aspect, information for associating is included in a beacon signal broadcast by the AP 104. To receive such a beacon, the relay 107b can, for example, perform a broad coverage search over a coverage region. The relay 107b can also perform a search by sweeping a coverage region in a lighthouse fashion, for example. After receiving the information for associating, the relay 107b can transmit a reference signal, such as an association probe or request, to the AP 104. In an embodiment, the relay 107b can utilize a first station address when exchanging network messages with the AP 104.

Similarly, the STA 106 can associate with the relay 107b as if it were an AP. In some aspects, the STA 106 can associate with the relay 107b and send communications to and/or receive communications from the relay 107b. In one aspect, information for associating is included in a beacon broadcast by the relay 107b. After receiving the information for associating, the STA 106 can transmit a reference signal, such as an association probe or request, to the relay 107b. In one embodiment, the relay 107b can utilize a second station address that is different than the first station address when exchanging network messages with one or more stations.

FIG. 4B illustrates a wireless communications system 450, according to another embodiment. The wireless communications system 450 includes a relay 107b, a relay 107c, and a station (STA) 106. Note that while only one STA 106 and only two relays 107b-107c are illustrated, the wireless communications system 450 can include any number of STAs and relays.

In some disclosed implementations, the relay 107c can communicate with the relay 107b in the same manner as a station would communicate with an AP. In some aspects, the relay 107c can implement WI-FI DIRECT™ point-to-point group owner capability or SoftAP capability. In some aspects, the relay 107c can associate with the relay 107b and send communications to and/or receive communications from the relay 107b. In one aspect, information for associating is included in a beacon signal broadcast by the relay 107b. To receive such a beacon, the relay 107c can, for example, perform a broad coverage search over a coverage region. A search can also be performed by the relay 107c by sweeping a coverage region in a lighthouse fashion, for example. After receiving the information for associating, the relay 107c can transmit a reference signal, such as an association probe or request, to the relay 107b. In an embodiment, the relay 107c can utilize a first station address when exchanging network messages with the relay 107b.

Similarly, the STA 106 can associate with the relay 107c as if it were an AP. In some aspects, the STA 106 can associate with the relay 107c and send communications to and/or receive communications from the relay 107c. In one aspect, information for associating is included in a beacon broadcast by the relay 107c. After receiving the information for associating, the STA 106 can transmit a reference signal, such as an association probe or request, to the relay 107c. In one embodiment, the relay 107c can utilize a second station address that is different than the first station address when exchanging network messages with one or more stations.

Figure 4C:
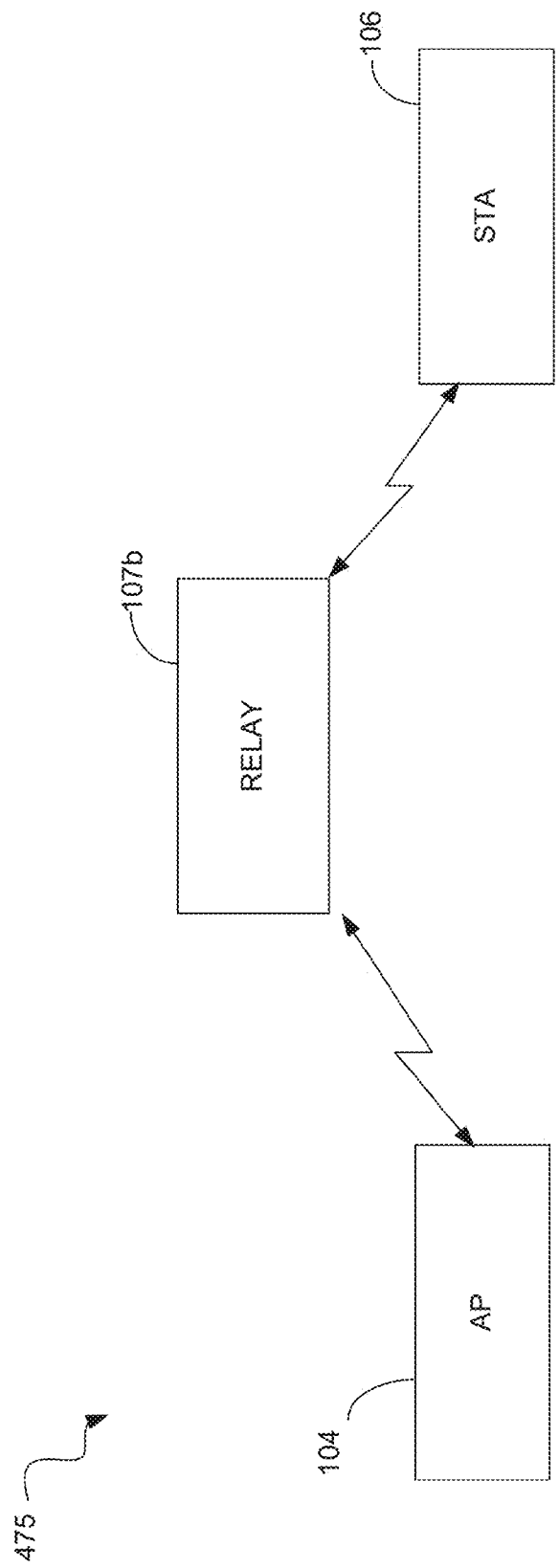
FIG. 4C illustrates a wireless communications system, according to another embodiment.

FIG. 4C illustrates a wireless communications system 475, according to an embodiment. The wireless communications system 400 includes an AP 104, a station (STA) 106, and a relay 107b. Note that while only one STA 106 and only one relay 107b are illustrated, the wireless communications system 400 can include any number of STAs and relays. In some embodiments, the AP 104 can be outside the transmission range of the STA 106. In some embodiments, the STA 106 can also be outside the transmission range of the AP 104. In these embodiments, the AP 104 and the STA 106 can communicate with the relay 107, which can be within the transmission range of both the AP 104 and STA 106. In some embodiments, both the AP 104 and STA 106 can be within the transmission range of the relay 107b.

In some implementations, the relay 107b can communicate with the AP 104 in the same manner as a STA would communicate with the AP. In some aspects, a relay 107b can associate with the AP 104 and send communications to and/or receive communications from the AP 104. In one aspect, information for associating is included in a beacon signal broadcast by the AP 104. To receive such a beacon, the relay 107b can, for example, perform a broad coverage search over a coverage region. The relay 107b can also perform a search by sweeping a coverage region in a lighthouse fashion, for example. After receiving the information for associating, the relay 107b can transmit a reference signal, such as an association probe or request, to the AP 104. In an embodiment, the relay 107b can utilize a first station address when exchanging network messages with the AP 104.

In the illustrated embodiment of FIG. 4C, the STA 106 associates with the AP 104, through the relay 107b. The relay 107b shown in FIG. 4C does not implement the functionality of a separate AP, in contrast to the embodiment discussed above with respect to FIG. 4A. In an embodiment, the relay 107b mimics one or more aspects of the AP 104. For example, the relay 107b can broadcast information for associating with the AP 104 in a beacon. The beacon can include a network address of the AP 104. For example, the beacon can include a media access control (MAC) address of the AP 104, instead of the MAC address of the relay 107b. After receiving the information for associating, the STA 106 can transmit a reference signal, such as an association probe or request, to the relay 107b. In an embodiment, the relay 107b can reply to the probe request using the network address of the AP 104. For example, the relay 107b can indicate the MAC address of the AP 104 in a probe response.

Accordingly, the relay 107b can act as a tunnel or pass-through during association between the STA 106 and the AP 104. The relay 107b can be configured to mimic aspects of the AP 104, and can forward packets from the STA 106 to the AP 104. The relay 107b can also forward packets from the AP 104 to the STA 106. The association between the STA 106 and the AP 104 is described below, with respect to FIG. 5.

Figure 5:
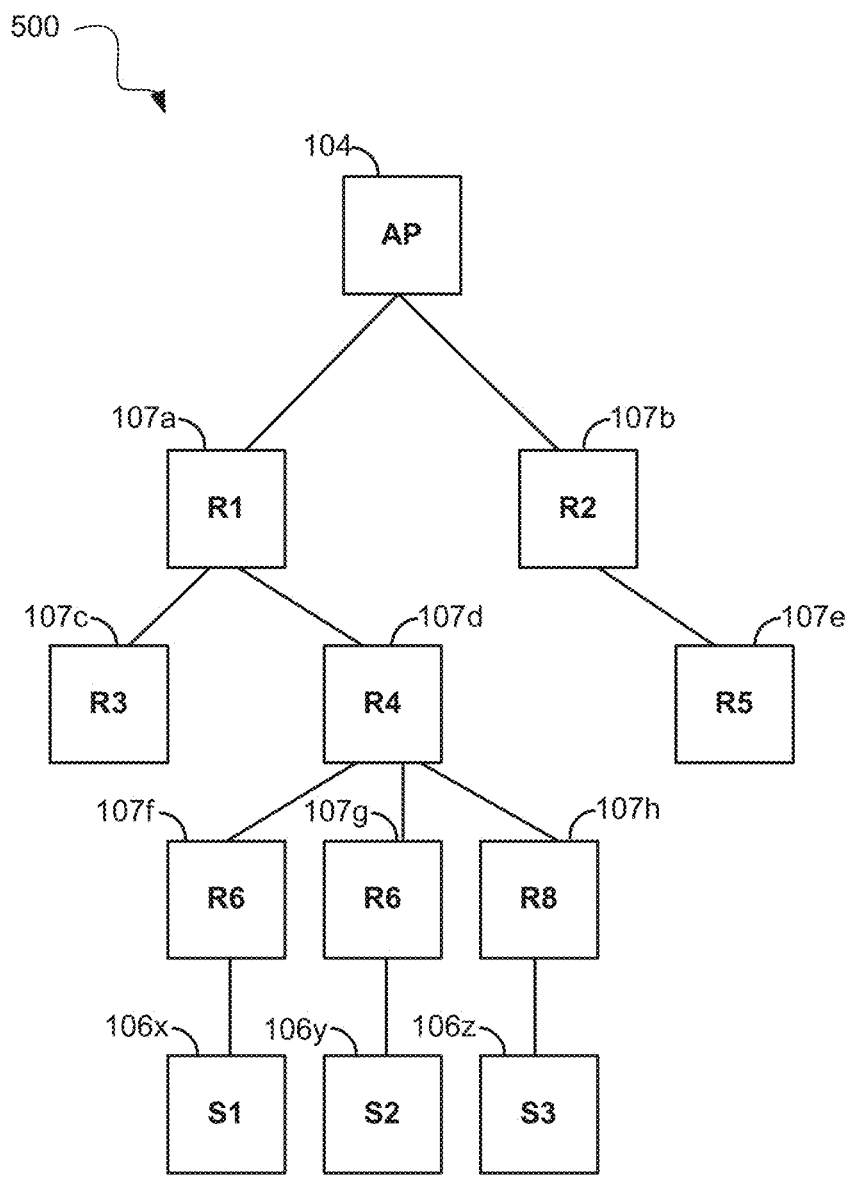
FIG. 5 illustrates a wireless communications system, according to another embodiment.

FIG. 5 illustrates a wireless communications system 500, according to another embodiment. The wireless communications system 500 includes a plurality of nodes, including the AP 104, relays 107a-107h, and STAs 106x-106z. In an embodiment, the wireless communications system 500 can be a multi-hop mesh network, as described above with respect to FIGS. 2A-B.

As shown in FIG. 5A, the STAs 106x-106z associate with the AP 104 through the relays 107f-107h, respectively. In turn, the relays 107f-107h associate with the AP 104 through the relay 107d. The relays 107c-107d associate with the AP 104 through the relay 107a, and the relay 107e associates with the AP 104 through the relay 107b. The relays 107a-107b associate directly with the AP 104. In various embodiments, additional APs, STAs, and/or relays (not shown) can be included in the wireless communications system 500, and some APs, STAs, and/or relays can be omitted.

As discussed above, with respect to FIG. 4C, the STAs 106x-106z can associate indirectly with the AP 104, through the relays 107f-107h, respectively. For example, the relay 107f can transmit a beacon (or send a probe response) including the MAC address of the AP 104. The STA 106x can receive the MAC address of the AP 104 via the beacon or probe response. The STA 106x can generate an association request addressed to the AP 104. For example, the association request can include the MAC address of the AP 104 in an A3 field of a MAC protocol data unit (MPDU) header. The STA 106x can transmit the association request via a four-address management frame, as discussed below with respect to FIG. 12. The STA 106x can transmit the association request in accordance with an extensible authentication protocol (EAP) or EAP over LAN (EAPOL), via four-address data frames. The STA 106x can transmit the association request to the relay 107f, for delivery to the AP 104.

The relay 107f can receive the association request from the STA 106x. The relay 107f can acknowledge the association request, and can forward the association request to the AP 104. In an embodiment, the association request can be encrypted. The relay 107f can forward the association request to the AP 104 without decrypting the payload. In an embodiment, the STA 106x and the AP 104 can derive encryption keys not available to the relay 107f.

The AP 104 can respond to the association request. For example, the AP 104 can transmit an association response in a four-address management frame, as discussed below with respect to FIG. 12. The relay 107f can receive the response, and can forward the response to the STA 106x. In an embodiment, the association can fail. When an association fails, the AP 104 can send a notification to one or more of the relays 107a-107h. The notification can indicate a STA address to block from the network. For example, the AP 104 can send a notification to the relay 107a, indicating that the STA 106x is forbidden from accessing the network. The relay 107a can filter, reject, or drop subsequent packets received from the STA 106x.

In an embodiment, the relay 107a stops, filters, rejects, or drops subsequent packets received from the STA 106x after a preset or variable filtering timeout or expiration. For example, the notification to the relay 107a, indicating that the STA 106x is forbidden from accessing the network, can indicate a duration for which the STA 106x is forbidden from accessing the network. After the filtering timeout or expiration, the relay 107a can allow subsequent packets received from the STA 106x.

Figure 6:
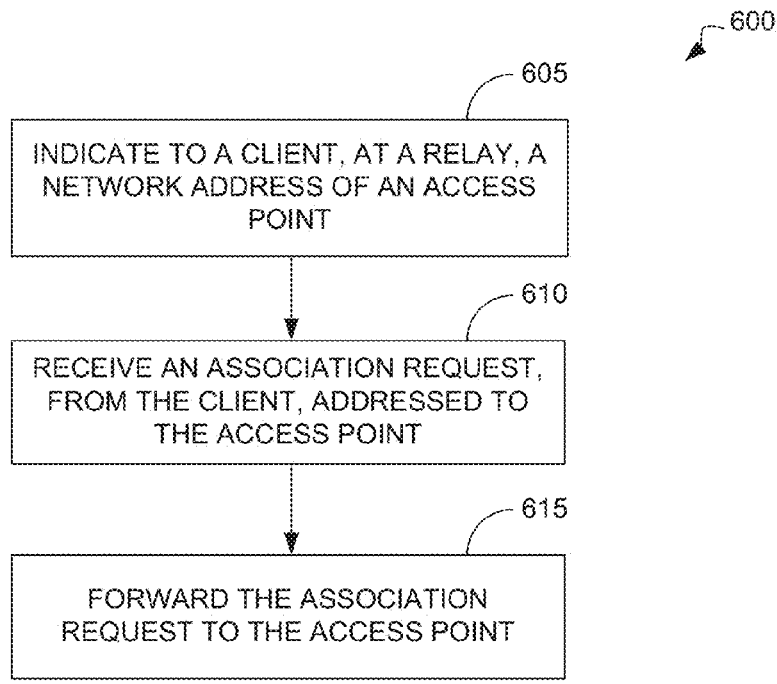
FIG. 6 is a flowchart of an exemplary method of communicating in a wireless network.

FIG. 6 is a flowchart 600 of an exemplary method of communicating in a wireless network. For example, the method of the flowchart 600 can be implemented within the wireless communication system 200, 250, 400, 450, 475, and/or 500, described above with respect to FIGS. 2A, 2B, 4A, 4B, 4B, and 5, respectively. Particularly, the method of the flowchart 600 can be implemented by one or more of the AP 104 and the relays 107a-h. Although the method of the flowchart 600 is described herein with particular reference to the wireless device 302, discussed above with respect to FIG. 3, and the wireless communication system 500, discussed above with respect to FIG. 5, a person having ordinary skill in the art will appreciate that the method of flowchart 600 can be implemented by any other suitable device. In an embodiment, the steps in the flowchart 600 can be performed by a processor or controller, such as the processor 304 or the DSP 320 in conjunction with one or more of the memory 306, the transmitter 310, and the receiver 312, described above with respect to FIG. 3. Although the method of the flowchart 600 is described herein with reference to a particular order, in various embodiments, blocks herein can be performed in a different order, or omitted, and additional blocks can be added.

First, at block 605, a relay indicates, to a client, a network address of an access point. For example, with reference to FIG. 5, the relay 107f can broadcast a beacon, or transmit a probe response, including the MAC address of the AP 104. The STA 106x can receive the beacon or probe response including the MAC address of the AP 104. In an embodiment where the wireless device 302 is configured as the relay 107f, the processor 304 can cause the transmitter 310 to transmit the beacon or probe response.

Next, at block 610, the relay can receive an association request from the client. The association request can be addressed to the access point. For example, with reference to FIG. 5, the relay 107f can receive the association request from the STA 106x. The association request can be addressed to the MAC address of the AP 104. In an embodiment where the wireless device 302 is configured as the relay 107f, the processor 304 can cause the receiver 312 to receive the association request. The association request can be stored in the memory 306.

Then, at block 615, the relay can forward the association request to the access point. For example, with reference to FIG. 5, the relay 107f can forward the association request to the AP 104. In an embodiment where the wireless device 302 is configured as the relay 107f, the processor 304 can cause the transmitter 310 to transmit the association request. The association request can be retrieved from the memory 306.

Figure 7:
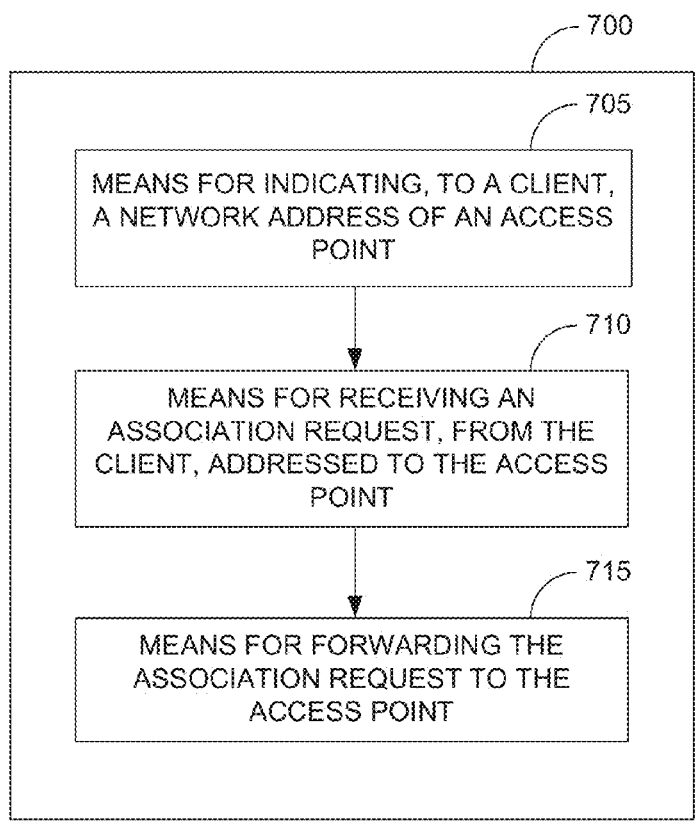
FIG. 7 is a functional block diagram of a wireless device, in accordance with an exemplary embodiment of the invention.

FIG. 7 is a functional block diagram of a wireless device 700, in accordance with an exemplary embodiment of the invention. Those skilled in the art will appreciate that a wireless power apparatus can have more components than the simplified wireless device 700 shown in FIG. 7. The wireless device 700 shown includes only those components useful for describing some prominent features of implementations within the scope of the claims. The wireless device 700 includes means 705 for indicating, to a client, a network address of the access point, means 710 for receiving an association request, from the client, addressed to the access point, and means 715 for forwarding the association request to an access point.

In an embodiment, the means 705 for indicating, to a client, a network address of the access point can be configured to perform one or more of the functions described above with respect to block 605 (FIG. 6). In various embodiments, the means 705 for indicating, to a client, a network address of the access point can be implemented by one or more of the processor 304 (FIG. 3), the memory 306 (FIG. 3), the transmitter 310 (FIG. 3), the DSP 320 (FIG. 3), and the antenna 316 (FIG. 3).

In an embodiment, the means 710 for receiving an association request, from the client, addressed to the access point can be configured to perform one or more of the functions described above with respect to block 610 (FIG. 6). In various embodiments, the means 710 for receiving an association request, from the client, addressed to the access point can be implemented by one or more of the processor 304 (FIG. 3), the memory 306 (FIG. 3), the signal detector 318 (FIG. 3), the receiver 312 (FIG. 3), the DSP 320 (FIG. 3), and the antenna 316 (FIG. 3).

In an embodiment, the means 715 for forwarding the association request to an access point can be configured to perform one or more of the functions described above with respect to block 615 (FIG. 6). In various embodiments, the means 715 for forwarding the association request to an access point can be implemented by one or more of the processor 304 (FIG. 3), the memory 306 (FIG. 3), the transmitter 310 (FIG. 3), the DSP 320 (FIG. 3), and the antenna 316 (FIG. 3).

Figure 8:
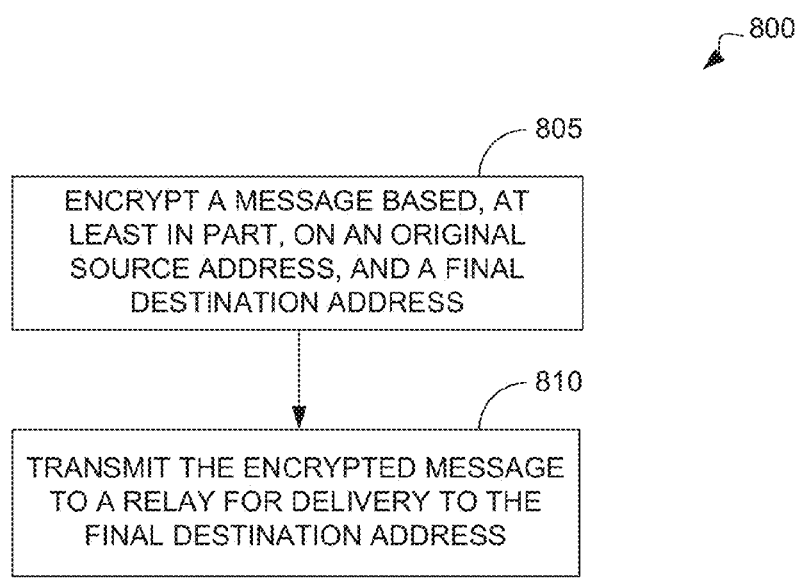
FIG. 8 is a flowchart of another exemplary method of communicating in a wireless network.

FIG. 8 is a flowchart 800 of another exemplary method of communicating in a wireless network. For example, the method of the flowchart 800 can be implemented within the wireless communication system 200, 250, 400, 450, 475, and/or 500, described above with respect to FIGS. 2A, 2B, 4A, 4B, 4B, and 5, respectively. Particularly, the method of the flowchart 800 can be implemented by one or more of the AP 104 and the relays 107a-h. Although the method of the flowchart 800 is described herein with particular reference to the wireless device 302, discussed above with respect to FIG. 3, and the wireless communication system 500, discussed above with respect to FIG. 5, a person having ordinary skill in the art will appreciate that the method of flowchart 800 can be implemented by any other suitable device. In an embodiment, the steps in the flowchart 800 can be performed by a processor or controller, such as the processor 304 or the DSP 320 in conjunction with one or more of the memory 306, the transmitter 310, and the receiver 312, described above with respect to FIG. 3. Although the method of the flowchart 800 is described herein with reference to a particular order, in various embodiments, blocks herein can be performed in a different order, or omitted, and additional blocks can be added.

First, at block 805, a device encrypts a message based, at least in part, on an original source address, and a final destination address. The device can include an access point and/or a STA. The message can include an association message. The encryption can include block chaining message authentication code protocol (CCMP) message. In some embodiments, the message can be encrypted in accordance with the IEEE standard 802.11™-2012.

In some embodiments, the encryption can be based on additional authentication data (AAD). The AAD can include data that are not encrypted, but are cryptographically protected. The AAD can be based on an original source address and/or a final destination address. In an embodiment, the AAD can have an address field A1 set to the source address (e.g., an MPDU address field A4). The AAD can have an address field A2 set to the final destination address (e.g., an MPDU address field A3). The AAD can have a masked quality-of-service (QOS) control field.

In some embodiments, the encryption can be based on a nonce. The nonce can be a CCMP nonce. The device can compute the nonce using the final destination address. For example, the nonce can include an address field A2 set to the final destination address (e.g., an MPDU address field A3).

For example, with reference to FIG. 5, the device can include the AP 104 and/or the STA 106x. In particular, the STA 106x can encrypt an authentication request by computing the AAD and nonce based on the original source address (e.g., the MAC address of the STA 106x) and the final destination address (e.g., the MAC address of the AP 104). In an embodiment where the wireless device 302 is configured as the STA 106x, the processor 304 can encrypt the authentication request. The AP 104 can encrypt an authentication response by computing the AAD and nonce based on the original source address (e.g., the MAC address of the AP 104) and the final destination address (e.g., the MAC address of the STA 106x). In an embodiment where the wireless device 302 is configured as the AP 104, the processor 304 can encrypt the authentication response.

Next, at block 810, the device can transmit the encrypted message to a relay for delivery to the final destination address. For example, with reference to FIG. 5, the STA 106x can transmit the encrypted authentication request to the relay 107f, which can forward the request to the AP 104. In an embodiment where the wireless device 302 is configured as the STA 106x, the processor 304 can cause the transmitter 310 to transmit the association request. The AP 104 can transmit the encrypted authentication response to the relay 107f, which can forward the response to the STA 106x. In an embodiment where the wireless device 302 is configured as the AP 104, the processor 304 can cause the transmitter 310 to transmit the association response.

Figure 9:
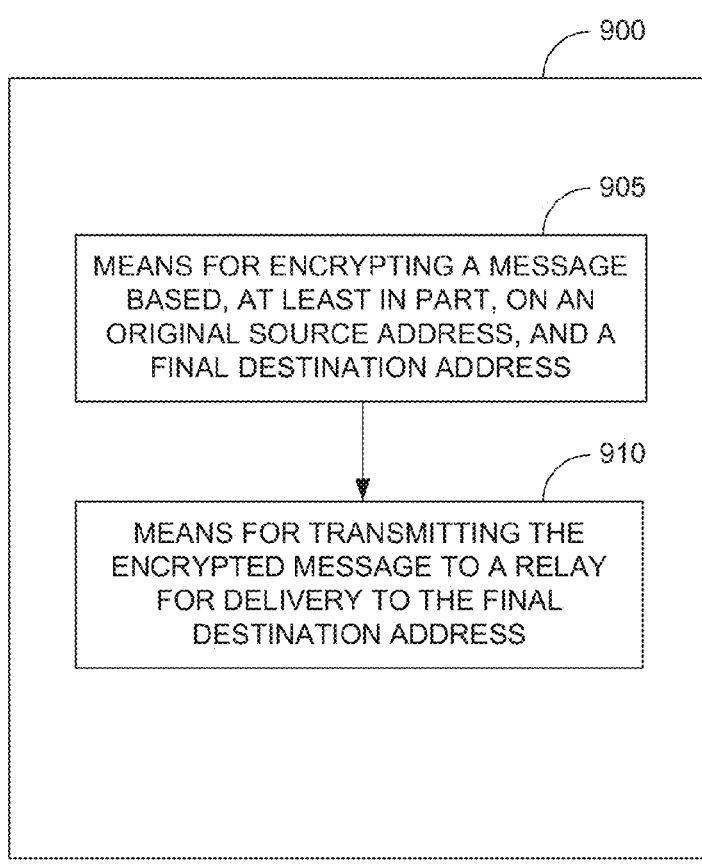
FIG. 9 is a functional block diagram of a wireless device, in accordance with another exemplary embodiment of the invention.

FIG. 9 is a functional block diagram of a wireless device 900, in accordance with another exemplary embodiment of the invention. Those skilled in the art will appreciate that a wireless power apparatus can have more components than the simplified wireless device 900 shown in FIG. 9. The wireless device 900 shown includes only those components useful for describing some prominent features of implementations within the scope of the claims. The wireless device 900 includes means 905 for encrypting a message based, at least in part, on an original source address, and a final destination address, and means 910 for transmitting the encrypted message to a relay for delivery to the final destination address.

In an embodiment, the means 905 for encrypting a message based, at least in part, on an original source address, and a final destination address can be configured to perform one or more of the functions described above with respect to block 805 (FIG. 8). In various embodiments, the means 905 for encrypting a message based, at least in part, on an original source address, and a final destination address can be implemented by one or more of the processor 304 (FIG. 3), the memory 306 (FIG. 3), and the DSP 320 (FIG. 3).

In an embodiment, the means 910 for transmitting the encrypted message to a relay for delivery to the final destination address can be configured to perform one or more of the functions described above with respect to block 810 (FIG. 8). In various embodiments, the means 910 for transmitting the encrypted message to a relay for delivery to the final destination address can be implemented by one or more of the processor 304 (FIG. 3), the memory 306 (FIG. 3), the DSP 320 (FIG. 3), and the antenna 316 (FIG. 3).

Figure 10:
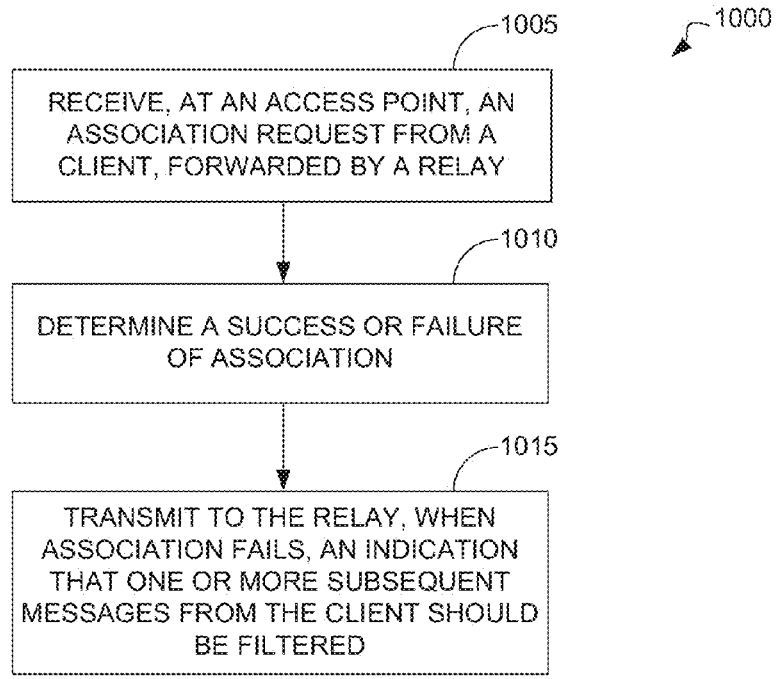
FIG. 10 is a flowchart of another exemplary method of communicating in a wireless network.

FIG. 10 is a flowchart 1000 of another exemplary method of communicating in a wireless network. For example, the method of the flowchart 1000 can be implemented within the wireless communication system 200, 250, 400, 450, 475, and/or 500, described above with respect to FIGS. 2A, 2B, 4A, 4B, 4B, and 5, respectively. Particularly, the method of the flowchart 1000 can be implemented by one or more of the AP 104 and the relays 107a-h. Although the method of the flowchart 1000 is described herein with particular reference to the wireless device 302, discussed above with respect to FIG. 3, and the wireless communication system 500, discussed above with respect to FIG. 5, a person having ordinary skill in the art will appreciate that the method of flowchart 1000 can be implemented by any other suitable device. In an embodiment, the steps in the flowchart 1000 can be performed by a processor or controller, such as the processor 304 or the DSP 320 in conjunction with one or more of the memory 306, the transmitter 310, and the receiver 312, described above with respect to FIG. 3. Although the method of the flowchart 1000 is described herein with reference to a particular order, in various embodiments, blocks herein can be performed in a different order, or omitted, and additional blocks can be added.

First, at block 1005, an access point receives an association request from a client. The association request can be forwarded by a relay. The association request can be received via a four-address management frame. For example, with reference to FIG. 5, the STA 106x can transmit the association request to the AP 104. The relay 107f can forward the association request. Thus, the AP 104 can receive the association request. In an embodiment where the wireless device 302 is configured as the AP 104, the processor 304 can cause the receiver 312 to receive the association request. The association request can be stored in the memory 306.

Next, at block 1010, the access point can determine a success or failure of association. The association can fail, for example, when the client cannot authenticate to the network. For example, with reference to FIG. 5, the AP 104 can determine whether the STA 106x is authorized to access the network. In an embodiment where the wireless device 302 is configured as the AP 104, the processor 304 can determine success or failure of the association.

Then, at block 1015, the access point can transmit, when association fails, an indication that one or more subsequent messages from the client should be filtered. The access point can transmit the indication to one or more relays. For example, with reference to FIG. 5, the AP 104 can transmit, to the relay 107f, an indication that the STA 106x is forbidden from accessing the network. In turn, the relay 107f can drop, filter, or otherwise block packets transmitted by the STA 106x. In some embodiments, the indication that the STA 106x is forbidden can include an implicit or explicit expiration. In an embodiment where the wireless device 302 is configured as the AP 104, the processor 304 can cause the transmitter 310 to transmit the indication that one or more subsequent messages from the client should be filtered.

Figure 11:
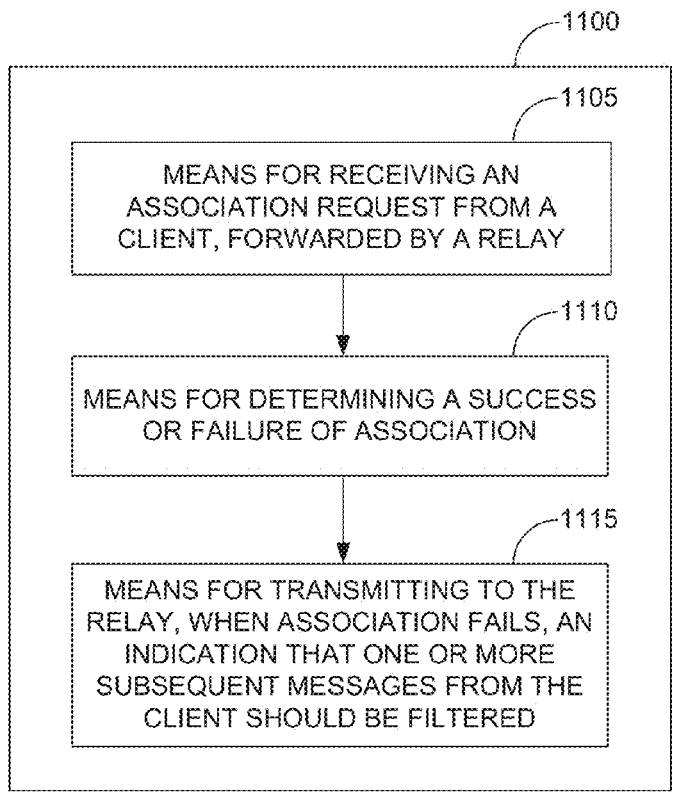
FIG. 11 is a functional block diagram of a wireless device, in accordance with another exemplary embodiment of the invention

FIG. 11 is a functional block diagram of a wireless device 1100, in accordance with another exemplary embodiment of the invention. Those skilled in the art will appreciate that a wireless power apparatus can have more components than the simplified wireless device 1100 shown in FIG. 11. The wireless device 1100 shown includes only those components useful for describing some prominent features of implementations within the scope of the claims. The wireless device 1100 includes means 1105 for receiving an association request from a client, forwarded by a relay, means 1110 for determining a success or failure of association, and means 1115 for transmitting to the relay, when association fails, an indication that one or more subsequent messages from the client should be filtered.

In an embodiment, the means 1105 for receiving an association request from a client, forwarded by a relay can be configured to perform one or more of the functions described above with respect to block 1005 (FIG. 10). In various embodiments, the means 1105 for receiving an association request from a client, forwarded by a relay can be implemented by one or more of the processor 304 (FIG. 3), the memory 306 (FIG. 3), the receiver 312 (FIG. 3), the DSP 320 (FIG. 3), and the antenna 316 (FIG. 3).

In an embodiment, the means 1110 for determining a success or failure of association can be configured to perform one or more of the functions described above with respect to block 1010 (FIG. 10). In various embodiments, the means 1110 for determining a success or failure of association can be implemented by one or more of the processor 304 (FIG. 3), the memory 306 (FIG. 3), and the DSP 320 (FIG. 3).

In an embodiment, the means 1115 for transmitting to the relay, when association fails, an indication that one or more subsequent messages from the client should be filtered can be configured to perform one or more of the functions described above with respect to block 1015 (FIG. 10). In various embodiments, the means 1115 for transmitting to the relay, when association fails, an indication that one or more subsequent messages from the client should be filtered can be implemented by one or more of the processor 304 (FIG. 3), the memory 306 (FIG. 3), the transmitter 310 (FIG. 3), the DSP 320 (FIG. 3), and the antenna 316 (FIG. 3).

Figure 12:
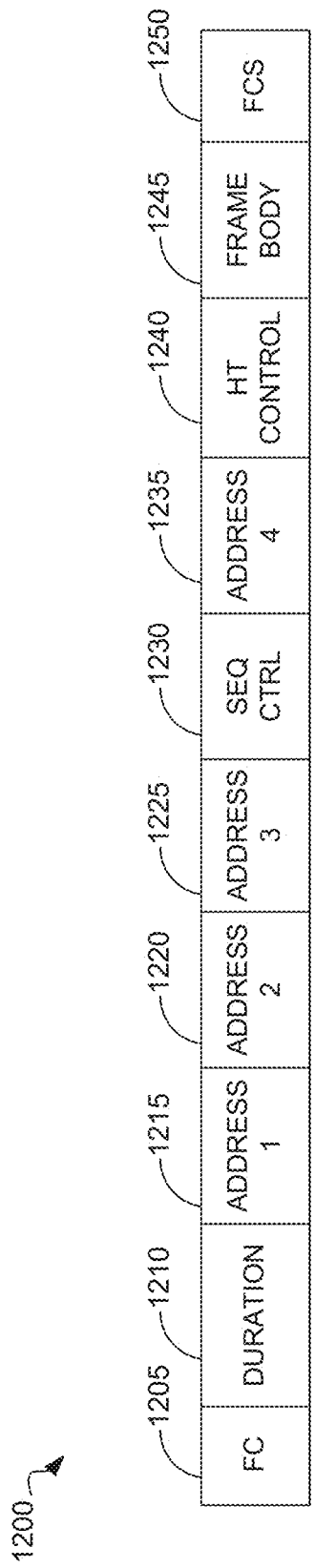
FIG. 12 shows an exemplary four-address management frame format.

FIG. 12 shows an exemplary four-address management frame 1200 format. As discussed above, one or more messages in the wireless communication system 200, 250, 400, 450, 475, and/or 500, described above with respect to FIGS. 2A, 2B, 4A, 4B, 4B, and 5, respectively, can include the four-address management frame 1200. In the illustrated embodiment, the four-address management frame 1200 includes frame control (FC) field 1205, a duration field 1210, a first address field 1215, a second address field 1220, a third address field 1225, a sequence control field 1230, a fourth address field 1235, a high-throughput (HT) control field 1240, a frame body 1245, and a frame check sequence (FCS) 1250. The fourth address field can serve, for example, as a forwarding address.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of communicating in a wireless network comprising an access point and a relay, the method comprising:
   indicating to a client, at the relay, a network address of the access point;
   receiving an association request, from the client, addressed to the network address of the access point;
   forwarding the association request to the access point; and
   filtering packets from the client based upon an indication from the access point.

2. The method of claim 1, wherein indicating the network address of the access point comprises transmitting the address in a beacon or probe response.

3. The method of claim 1, further comprising forwarding one or more authentication packets to and from the client and the access point.

4. The method of claim 3, wherein the authentication packets comprise extensible authentication protocol (EAP) packets in four-address data frames.

5. The method of claim 3, wherein the authentication packets are encrypted and forwarding the authentication packets comprises forwarding the authentication packets without decrypting the packets.

6. The method of claim 1, further comprising filtering packets from the client when the association request fails.

7. The method of claim 6, wherein said filtering expires after a filtering timeout.

8. The method of claim 1, wherein the indication from the access point indicates that one or more subsequent messages from the client should be filtered until a filtering expiration.

9. The method of claim 1, wherein the association request comprises a four-address management frame.

10. A device configured to communicate in a wireless network comprising an access point and a relay, the device comprising:
a processor configured to:
indicate to a client, a network address of the access point, and
filter packets from the client based upon an indication from the access point;
a receiver configured to receive an association request, from the client, addressed to the network address of the access point; and
a transmitter configured to forward the association request to the access point.

11. The device of claim 10, wherein indicating the network address of the access point comprises transmitting the address in a beacon or probe response.

12. The device of claim 10, wherein the transmitter is further configured to forward one or more authentication packets to and from the client and the access point.

13. The device of claim 12, wherein the authentication packets comprise extensible authentication protocol (EAP) packets in four-address data frames.

14. The device of claim 12, wherein the authentication packets are encrypted and forwarding the authentication packets comprises forwarding the authentication packets without decrypting the packets.

15. The device of claim 10, wherein the processor is further configured to filter packets from the client when the association request fails.

16. The device of claim 15, wherein said filtering expires after a filtering timeout.

17. The device of claim 15, wherein the association request comprises a four-address management frame.

18. An apparatus for communicating in a wireless network comprising an access point and a relay, the apparatus comprising:
means for indicating to a client, a network address of the access point;
means for receiving an association request, from the client, addressed to the network address of the access point;
means for forwarding the association request to the access point; and
means for filtering packets from the client based upon an indication from the access point.

19. The apparatus of claim 18, wherein means for indicating the network address of the access point comprises means for transmitting the address in a beacon or probe response.

20. The apparatus of claim 18, further comprising means for forwarding one or more authentication packets to and from the client and the access point.

21. The apparatus of claim 20, wherein the authentication packets comprise extensible authentication protocol (EAP) packets in four-address data frames.

22. The apparatus of claim 20, wherein the authentication packets are encrypted and means for forwarding the authentication packets comprises means for forwarding the authentication packets without decrypting the packets.

23. The apparatus of claim 18, further comprising means for filtering packets from the client when the association request fails.

24. The apparatus of claim 23, wherein said filtering is in response to an indication from the access point.

25. The apparatus of claim 23, wherein said filtering expires after a filtering timeout.

26. The apparatus of claim 23, wherein the association request comprises a four-address management frame.

27. A non-transitory computer-readable medium comprising code that, when executed, causes an apparatus to:
indicate, to a client, a network address of the access point;
receive an association request, from the client, addressed to the network address of the access point;
forward the association request to the access point; and
filter packets from the client based upon an indication from the access point.

28. The medium of claim 27, further comprising code that, when executed, causes the apparatus to transmit the address in a beacon or probe response.

29. The medium of claim 27, further comprising code that, when executed, causes the apparatus to forward one or more authentication packets to and from the client and the access point.

30. The medium of claim 29, wherein the authentication packets comprise extensible authentication protocol (EAP) packets in four-address data frames.

31. The medium of claim 30, wherein the authentication packets are encrypted, further comprising code that, when executed, causes the apparatus to forward the authentication packets without decrypting the packets.

32. The medium of claim 27, further comprising code that, when executed, causes the apparatus to filter packets from the client when the association request fails.

33. The medium of claim 32, wherein said filtering expires after a filtering timeout.

34. The medium of claim 32, wherein the association request comprises a four-address management frame.

* * * * *